United States Patent [19]

Wagner

[11] 4,398,065

[45] Aug. 9, 1983

[54] CIRCUIT ARRANGEMENT FOR DETERMINING THE ZONE OF ORIGIN OF A TELEPHONE CONNECTION

[75] Inventor: Karl Wagner, Munich, Fed. Rep. of Germany

[73] Assignee: Siemens Aktiengesellschaft, Berlin & Munich, Fed. Rep. of Germany

[21] Appl. No.: 341,655

[22] Filed: Jan. 22, 1982

Related U.S. Application Data

[63] Continuation-in-part of Ser. No. 319,265, Nov. 9, 1981, abandoned, which is a continuation of Ser. No. 127,813, Mar. 6, 1980, abandoned.

[30] Foreign Application Priority Data

Mar. 21, 1979 [DE] Fed. Rep. of Germany ....... 2911150

[51] Int. Cl.³ .............................................. H04Q 1/22
[52] U.S. Cl. ....................... 179/18 FG; 179/175.31 R
[58] Field of Search ........... 179/18 FF, 18 FG, 17 A, 179/7 R, 7 MM, 8 R, 9, 11, 13, 175.31 R

[56] References Cited

U.S. PATENT DOCUMENTS 3,886,320  5/1975  Sutton ............................ 179/18 FG
4,088,841  5/1978  Weisigk et al. ................ 179/18 FG Primary Examiner—Gerald L. Brigance
Attorney, Agent, or Firm—Hill, Van Santen, Steadman, Chiara & Simpson

[57] ABSTRACT

A circuit arrangement determines the identity of a repeater in a telecommunications systems, in particular a telephone system, which, either individually or as one of several of a group, is permanently assigned to a specific zone of origin which is individually characterized by an incoming connection line. During establishment of a telephone connection, in particular an international telephone connection, or a connection foreign to the particular exchange, identification can be made individually in dependence upon the zone of origin of the calling subscriber and a control path, which serves to exchange signals, and which leads to a translator is established. The translator supplies, inter alia, information, for the ongoing connection establishment and for the assignment of a charge pulse train. This is carried out individually by switching elements which can be assigned accordingly, and having been requested, the translator initiates the transmission of a test signal by way of the control path which has been established back to the translator in order to identify the repeater being used. The test signal can be recorded, in assignment to a zone of origin, by an opto-electronic coupler which characterizes the particular zone of origin. A delay element is included between the opto-electronic coupler and a trigger circuit and has a delay time which is matched to the expected duration of interference pulses and the test signal is fed-in for an interval of time which at least exceeds the maximum occurring delay time. A multiple recording is also carried out during this time interval by a display device in order to indicate faults between one or more lines.

4 Claims, 1 Drawing Figure

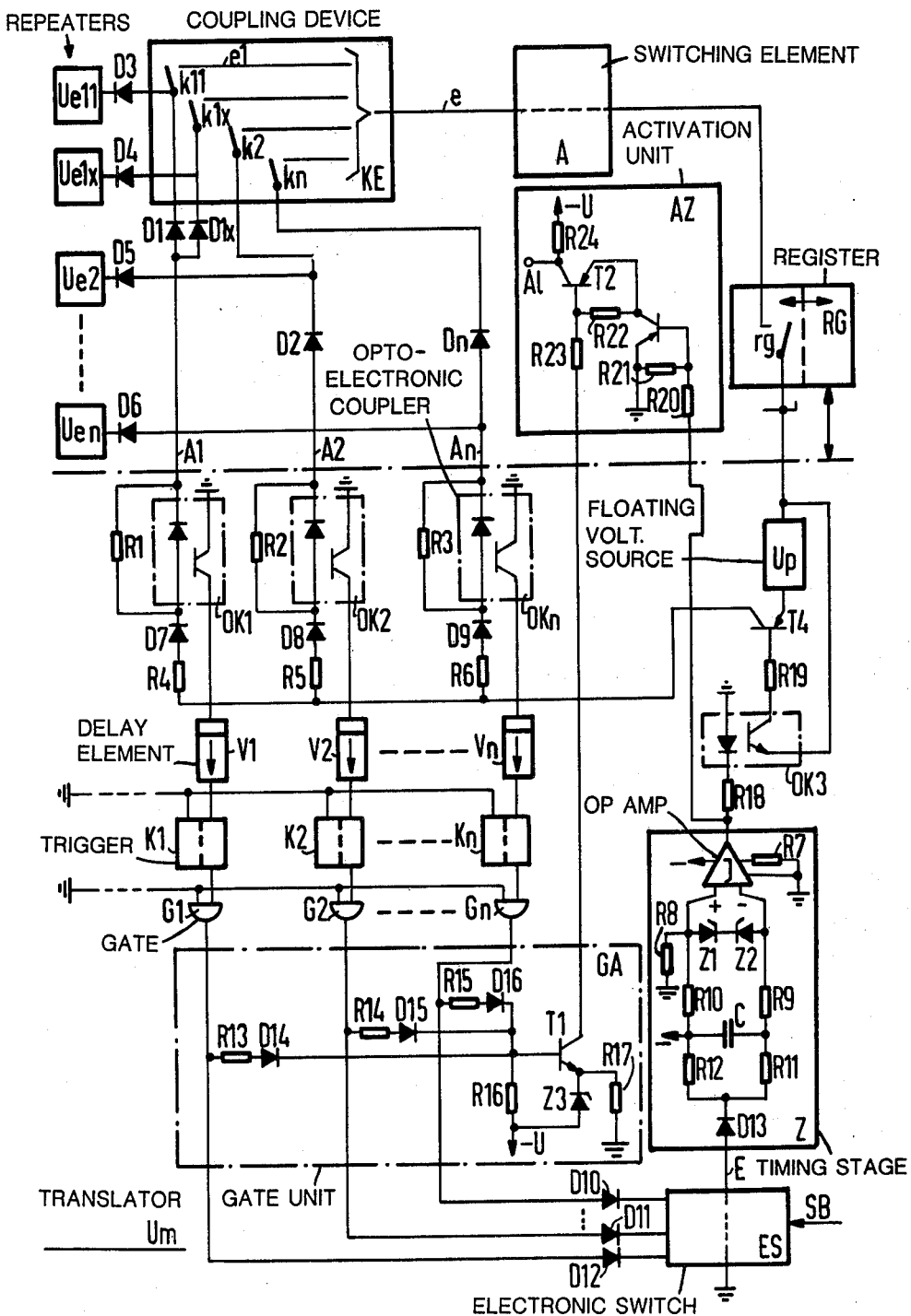

CIRCUIT ARRANGEMENT FOR DETERMINING THE ZONE OF ORIGIN OF A TELEPHONE CONNECTION

CROSS REFERENCE TO RELATED APPLICATION

This application is a continuation-in-part of application Ser. No. 319,265, filed Nov. 9, 1981, now abandoned, which is a continuation of Ser. No. 127,813, filed Mar. 6, 1980, now abandoned.

BACKGROUND OF THE INVENTION

1. Field of the Invention

The present invention relates to a circuit arrangement for determining the identification of a repeater in telecommunications systems, in particular telephone systems, which, either individually, or as one of several, are permanently assigned to a specific zone of origin, individually characterized by an incoming connection line, and therefore can be used individually for the establishment of a telephone connection, depending upon the zone of origin of the calling subscriber, and a control path, used for the exchange of signals, to a translator which inter alia supplies information for the ongoing connection establishment and for the assignment of a charge pulse train can be individually switched through by means of switching elements which can be set up appropriately.

In addition, the translator having been called up, instigates the transmission of a test signal by way of a control path which has been established back to the translator in order to establish the repeater which is being used, and the test signal can be recorded, in assignment to a zone of origin, by indicating switching means which characterizes this zone for further analysis.

2. Description of the Prior Art

In particular, for the tariff assessment of international telephone connections established by automatic trunk dialing, one of the items of information which must be known in the routing control station of the so-called foreign head exchange, is the zone of origin of such a connection. From the country code which a subscriber transmits as dialed information, it will be clear that this is a connection which must be zoned in this exchange. The foreign metering pulse generator assigned to the individual trunk lines instigates connection to a central translator which must be carried out by way of a corresponding register. As soon as the register in question, which can be used during the connection establishment, has received, for example, the direction determining component of the dialed information, a request signal for the translator is formed. The request signal then supplies the register with, inter alia, the setting-up information required for the establishment of the on-going connection path. It also serves to form the information required for the charge assessment. Since the incoming trunk dialing repeaters are permanently assigned, either individually or in groups, to specific connection lines which determine the relevant zone of origin, the relevant zone of origin can be determined by interrogating the seized repeater. For this purpose, in response to an appropriate request, the translator can transmit a test signal by way of the seized register and by way of the control path which is set up to continue the relevant repeater. From here, this pulse passes to a receiving circuit which is permanently assigned to every possible zone of origin and is contained in the translator. The assigned zone of origin becomes known when one of the received circuits responds. It will be likely that, on account of the spatial arrangement of the repeaters and the translator within the relevant exchange, the test circuit will include a long system cable section. This involves the danger that mis-analysis will occur as a result of input-coupled interference pulses in the order of magnitude of the useful test pulse. A faulty statement can also occur if, due to faulty contact of individual test wires, a receiving circuit other than that assigned to the seized repeater responds. The influence of lines could also result in a fed-in test signal changing in amplitude in such a way that the receiving circuit no longer responds.

SUMMARY OF THE INVENTION

The object of the present invention is to facilitate the establishment of a zone of origin in the manner generally set forth above so that the disturbing influences which lead to indirect analyses are no longer manifest.

The above object is achieved in a circuit arrangement of the type generally set forth above in that an opto-electronic switching element is used as an indication switching means for the test signal which is fed in floating fashion, and that each test circuit which is formed in the above manner must overcome a delay time which is matched to the likely duration of the interference pulse before a signal occurring therein is finally recorded. First, independently of any recording, the test signal continues to be fed in at least for an interval of time which exceeds the maximum occurring delay time, and a multiple recording effected during this length of time is additionally indicated.

The use of an opto-electronic switching element, normally an indicating switching means, not only affords protection against high static input-coupled voltages, but also allows the amplitude and duration of the test pulses to be matched in an optimum manner to the conditions governed, for example, by the properties of the circuit. The amplitude of the test signal can be selected to be such that severe flattening caused, for example, by line influence cannot exert a disadvantageous influence. The response delay provided for the opto-electronic switching element can largely prevent the influence of interference pulses. However, interference pulses can occur which exceed the average likely duration of the interference pulses and, therefore, cause the indication switching means to respond. If this were considered as a result of the origin establishment procedure, an incorrect analysis would occur. Furthermore, the delay times provided for each indication switching means can differ from one another due to the fact that the components which produce the delay are not entirely identical, so that it is possible that an interference pulse may be analyzed before a test signal fed in at the same time and may lead to an incorrect information. The interference pulse can also consist of a pulse derived from a useful pulse due to a faulty galvanic contact between two transmission wires. Interference pulses of this kind which overcome the prevailing delay time may be recognized by the fact that, according to the present invention, the origin establishment procedure initiated when the test pulse is fed in is not considered to be included directly on the response of an opto-electronic switching element. In spite of such a recording, the test signal continues to be connected for an interval of time which exceeds the maximum occurring delay time. This means that a test pulse of this kind will always cause the assigned opto-electronic switching element to respond. If, beginning with the fed-in time, another opto-electronic switching element has already responded, it may be concluded that the disturbance is occurring in this test situation. This disturbance can be caused, for example, by a faulty galvanic contact between two wires in the system cable which leads from the repeaters to the translator. Since the faulty multiple recording based on the test pulse is detected and indicated in accordance with the invention, the fault can be recognized. The origin of a fault of this kind can be eliminated whenever a specific fault frequency is exceeded during a specific period of time. The extension of the duration of a fed-in test signal, provided in accordance with the present invention, is facilitated by the use of the opto-electronic switching element which is normally employed as an indication switching means. If repeaters were used for this purpose, assuming that these would be of an economically viable size, it will be necessary to limit the analyzable test signal in respect of its duration. At the same time, the probability of the occurrence of the interference pulses in the order of magnitude of the test pulse would also increase. In contrast, the static analysis principle provided by the present invention means that in spite of the occurrence of an interference pulse prior to the recording of the actual test pulse, a signal to this effect can be made and, if necessary, the requisite steps for eliminating the fault can be introduced.

In accordance with a further development of the invention, the control element which allows the d.c. voltage test signal to be fed in in floating fashion can be operated for the given length of time on the basis of the signal which is produced when recording has taken place by means of a timer which is thereby started.

A further opto-electronic switching element can be used, for example, as a control element. For the floating feed-in the latter can connect, for example, a d.c. voltage derived by means of a voltage transformer by way of a test signal.

BRIEF DESCRIPTION OF THE DRAWING

Other objects, features and advantages of the invention, its organization, construction and operation will be best understood from the following detailed description, taken in conjunction with the accompanying drawing, on which there is a single FIGURE which is a schematic circuit diagram of an exemplary embodiment of the invention and which shows only those details necessary for an understanding of the invention.

DESCRIPTION OF THE PREFERRED EMBODIMENTS

Referring to the drawing, a plurality of repeaters Ue11, Ue1x . . . Uen have been arranged as incoming repeaters in an exchange which, as a so-called foreign head exchange, represents the junction between the national telephone service and the international telephone service. The individual repeaters Ue are permanently assigned, either individually or in groups, to the incoming lines from a specific zone of origin. These zones of origin must be known, for purposes of tariff assessment of foreign telephone connections established by automatic trunk dialing. Therefore, by means of an origin determination procedure, it must be established which repeater is being used, since the aforementioned permanent assignment will indicate the zone of origin.

In order that the required interrogation may be made, the repeaters of a zone of origin are assembled to form a group and are coupled to the assigned analysis circuit by way of a corresponding diode switching arrangement. This assembly, in the form of groups, has been indicated in respect of one zone of origin by the repeaters Ue11–Ue1x. As to the other zones of origin, only one repeater Ue2 to Uen has been illustrated. These can be combined in groups in the same manner as the repeaters assigned to the first-mentioned zone of origin.

The individual repeaters carry out switch-through and conversion functions and, in addition to dialed characteristics, also process the other switching characteristics required for the connection establishment control. Each time such a repeater is seized, a connection is established to a register RG by way of a coupling device KE by the actuation of an assigned contact k. These registers which are required during the connection establishment are provided in multiple. However, they will be considered smaller in number than the repeaters. A free register is selected by way of a selection switching element A. By way of a contact rg of a seized register, beginning from the seized repeater, for example, a control wire is galvanically switched through by way of a contact of the coupling device KE to a floating voltage source Up which is assigned to a translator Um. The seized register RG receives, inter alia, the series of dialed pulses and, when it has sufficient information, calls up the translator from which it obtains information regarding the further connection establishment and the required setting-up of charge assessment devices (toll ticketing equipment). For the last-mentioned purpose, the origin of the connection which is to be established must be known. The establishment of the repeater which is being used and the relevant zone of origin is carried out as follows:

The register which is connected to the seized repeater by way of a connection wire, for example a control wire e, calls up the translator Um in order that the requisite exchange of information may take place. This exchange of information must include the establishment of the seized repeater. For this purpose, a switch-through command SB is formed as a result of the request signal from the seized register to an electronic switch ES. As a result, ground potential is connected to a circuit point E. Following a short response time, governed by a resistor R12 and a capacitor C, this ground potential causes a corresponding output signal at an operational amplifier J and, therefore, at the output of a timing stage Z. This output signal causes the application of the floating voltage source Up into a test circuit and, therefore, causes the feeding-in of a floating d.c. voltage signal as a test signal. Beginning with this voltage source Up, the test circuit is connected to the repeater by way of the contact rg which has been actuated by the seized register, by way of the selector switching element A which carries out the setting up to the register, and by way of a control wire, for example the control wire e, e1 and by way of a contact k11 which, assuming that the repeater Ue11 is seized, is closed. If a different repeater were seized, the contact k, permanently assigned thereto, of the coupling device KE would be closed accordingly. A plurality of diodes D3–D6 serve for decoupling purposes.

From the respective contact, the check circuit then further proceeds via a diode shunt D1, D1x or, respectively, D2 or Dn to an opto-electronic coupling element OK1 or, respectively, OK2 . . . OKn and further proceeds via a limiting resistor R4 or, respectively, R5 or R6 back to the other terminal of the floating direct voltage source Up. The effective connection of this direct voltage source into the selected check circuit occurs during the time in which the switching transistor T4 is driven. The drive time of the transistor T4 is determined by the opto-electronic coupling element OK3 which is, in turn, driven by the output signal of the operational amplifier J of the timing stage Z. The transistor of the opto-electronic coupler OK3, in particular, is driven on the basis of the optical signal which is emitted by the luminescent diode which is part of the optocoupler, upon occurrence of the negative potential at the output of the operational amplifier J. As long as this output signal exists, therefore, the transistor T4 becomes conductive by way of the resistor R19 so that the check signal can be fed in.

As already explained above, a plurality of transmissions can be assigned to each source area. This is only indicated for a single source area, for example for the source area 1 by the repeaters Ue11 . . . Ue1x. The remaining repeaters are only illustrated as single transmitters, but in practice they likewise comprise a series of such repeaters per source area. The individual repeaters of each source area are combined by a diode array. For the repeaters assigned in the present example to the source area 1, this occurs by way of the diodes D1 . . . D1x. For the repeaters assigned to the other source areas, the respective diode array and the source area 2 is symbolically represented by the diode D2 and, for the source area n, is symbolically represented by a diode Dn. A lead extends from each diode array to an opto-electronic coupling element OK1 or, respectively, OK2 . . . OKn which evaluates an adjacent check signal. Spatially, these coupling elements are assigned to the existing converter Um. The leads A1, A2 . . . An lead from the location of the repeaters to the translator. The system cable formed by these conductors may, as a result of the spatial factors, extend for a length of several hundred meters. Each conductor which characterizes a group of origin extends, as already described, to an opto-electronic switching element of the translator. In the exemplary embodiment, these are the switching elements OK1, OK2 . . . OKn. A resistor which is connected in parallel to the diode path of an opto-electronic switching element serves to fulfill specific non-operating current conditions. These are the resistors R1, R2 and R3. The diodes which are connected in series with the opto-electronic couplers OK, thus the diodes D7-D9, serve for decoupling purposes. The output signal which is produced when the transistor path of each opto-electronic switching element switches through is used to set a trigger K by way of a delay element V. The output of the trigger is connected to an input of a gate G which has another input connected to a reference potential. These potentials are selected to be such that when the trigger reverses the gate becomes transmissive and thus supplies an output signal which blocks the switch-through of the switch ES. Similarly to the opto-electronic switching elements, the delay elements are referenced V1, V2 . . . Vn, the triggers are referenced K1, K2 . . . Kn and the aforementioned gates are referenced G1, G2 . . . Gn. It will be assumed that the test circuit which contains the opto-electronic switching element OK1 is closed so that the voltage source Up feeds a test signal into this circuit. As already described above, this is carried out by inserting this voltage source on the basis of the corresponding control signal which is emitted from the timing stage Z which serves, in particular, to influence the disconnection. This control command could also be applied directly on the switch-through of the electronic switch ES, and the timer, whose function will be explained later, could be arranged in the blocking circuit of this switch.

On its path across the contact rg, which is actuated by the register, the coupling contact k11 which is actuated, for example, when the incoming register Ue11 is seized, and by way of the diode D1, the test signal which has been fed in when the floating voltage source Up is connected, causes the response of the opto-electronic switching element OK1 which is permanently arranged, by way indication switching means, in the test circuit. The switch-through of the transistor path of this opto-electronic switching element is not directly forwarded as output information, but only on the expiration of a specific delay time. This delay is produced by the delay of element V1 whose delay time is matched to the likely duration of input-coupled interference pulses in the same manner as the delay time of the other delay elements which follow the other opto-electronic switching elements. As a result, interference pulses of this kind will not normally lead to the response of the other analysis elements. The fed-in test signal overcomes the response time governed by the delay element V1 and the output signal which is formed switches through the following trigger K1. At its output, which is connected to the gate G1, there occurs a signal which corresponds to the signal present at the other input of the gate G1, so that the gate G1 becomes transmissive and, consequently, produces a corresponding output signal. By way of the decoupling diode D12 assigned to this output, the output signal now influences the electronic switch ES in such a manner that it passes from the closed state to the open state. This results in the disconnection of the signal which has been connected as a result of the call-up, for example in the form of ground potential, and which serves to connect the voltage source.

This action does not result in the immediate disconnection of the d.c. voltage source from the switched-through test circuit, but in fact this connection, and thus the feed-in of the test signal, are maintained for a short length of time. This is achieved by means of the timer Z. In the exemplary embodiment which represents the timer Z, when the electronic switch ES is in the switched-through state, a negative potential occurs at the output and connects the voltage source Up. If, as a result of the blocking signal, which in the example is emitted from the output of the gate G1, the ground potential which controls the timer is no longer supplied, the charged capacitor C is discharged by way of the resistors R11 and R12. For such a time as the voltage value which occurs during this discharge exceeds the voltage value produced by means of the resistors R10 and R8 as a reference voltage value for the response of the operational amplifier J, the output signal of the amplifier which results in the connection of the d.c. voltage source is maintained. Not until this given reference voltage is undershot by the voltage occurring on the capacitor, does the output potential change in such a manner that the connection of the d.c. voltage source is terminated. The Zener diodes which are connected between the inputs of the amplifier J represent protective diodes since the difference between these inputs must not be allowed to exceed a specific value. The resistor R9 also represents a protective resistor. The timer Z which operates in the described manner is designed so that, from the time of the blockage of the electronic switch ES, the connection of the d.c. voltage source is maintained for approximately 1 millisecond. This is of substantial significance with regard to safeguarding the integrity and statement of such a test. It can be assumed that the delay times of the individual delay elements V will differ somewhat from one another because their components are not entirely identical. This could lead to the fact that an interference pulse which is input-coupled on a different conductor of the system cable, and which conforms approximately in terms of time with the fed-in test signal, may overcome the response threshold as a result of the aforementioned difference in delay times and lead, in the described manner to an output signal occurring at the gate G2, for example, and thus to the blockage of the electronic switch. If the voltage source were immediately disconnected, the original test signal could not be recorded as it no longer causes a setting of the trigger K1 which characterizes the actual test path. This means that the test process would lead to an incorrect result. As, however, the test signal is continued for a short length of time, the trigger is able to respond by way of the indication switching means assigned to the actual test circuit, namely the opto-electronic coupler OK1, by way of the following delay element. Therefore, a single request emanating from the seized register and processed by the translator will, in the case of the disturbance, lead to the activation of at least two characterization switching means provided in the form of trigger stages. This fact can be registered and made perceptible by way of the unit AZ, of which only a sub-circuit is illustrated. Therefore, it must be determined whether more than one of the gates G1 . . . Gn conducts an output signal and, accordingly, at least two different source areas are erroneously identified. This determination is undertaken by the unit GA by way of a threshold evaluation. The output of each gate G is connected by way of a resistor and a decoupling diode connected in series therewith to a precision resistor R16 which lies at the corresponding opposite potential, for example, the negative terminal of the supply voltage U. In the exemplary embodiment, the resistor-diode combination connected to the output of a gate is formed by the resistors R13 . . . R15 and by the diodes D14 . . . D16. The voltage drop occurring at the precision resistor R16 is evaluated by the transistor T1 for which a specific response threshold is predetermined by a Zener diode Z3. The resistor R17 serves for setting the operating point for the Zener diode Z3. The threshold value voltage is fixed in such a manner that in those cases in which an output signal occurs at only a single gate, the voltage drop occurring at the precision resistor R16 as a result of current flow is not sufficient to drive the transistor T1. This should only become the case when at least one further gate carries an output signal. If, therefore, at least two of the circuits are activated, the activation of the transistor T1 occurs due to the voltage drop at the resistor R16 which exceeds the threshold voltage. By way of a drive resistor R23, a transistor T2 of the unit AZ is always turned on when the transistor T3 is likewise driven. The transistor T3 is always switched on by the output of the unit Z via a drive resistor R20 when a check is being undertaken. As already described, negative potential arises at the output of the operational amplifier J at the check time. The resistors R21 or, respectively, R22, serve the purpose of inverse current dissipation for the transistor T3 or, respectively, for the transistor T2. Therefore, the unit AZ remains prepared for acceptance as long as the check circuit is actually closed by the connection of the direct voltage source $U_p$ caused by the output signal of the operational amplifier J. When the transistor T2 is driven under the described conditions, then a potential jump occurs at its collector resistor R24. By way of a counter (not illustrated in detail) connected to the circuit point A1, accordingly, the instances of double or, respectively, multiple registration which can be determined via the unit GA are counted. The individual disruptions can be summed up and, when a prescribed alarm limit is reached, a corresponding signal for maintenance personnel can occur. A double or multiple expression, given a requested source determination, could also be caused in that the leads of the system cable galvanically contact in a faulty manner. Accordingly, a useful pulse over one lead would appear on another lead as an interference pulse. Since the source determinations sequence in a very large plurality, the alarm limit given such a disruption would be reached within a very short time so that errors caused, for example, by leads shorting, are therefore detectable. Overall, the output signals of the gates G1, G2 . . . Gn are evaluated in a three-fold manner. On the one hand, the output signal forms an information for the converter Un as to which source area must form the basis for the appertaining connection. In those cases in which more than one gate carries an output signal and, accordingly, two different source areas are erroneously identified, that source area shall be evaluated by the converter as being applicable which corresponds to the less expensive rate of the two rates to be allocated. Further, as already described, the electronic switch ES is influenced by an output signal of a gate and, given more than one output signal, the transistor T1 is selected. Thereby, errors which are caused by lead contacting will be detectable within the shortest possible time. By means of a sufficient feed duration of the useful pulse, those cases in which an interference pulse is fed-in prior to the useful pulse and may lead to the response of a characteristic switching means.

If repeaters were used as indication switching means, this method of establishment would be extremely problematic since the dynamic analysis principle on which this operation would be based would limit the duration of the derived analysis pulses. If the useful signal were fed-in by way of a corresponding transmitting repeater, it could occur that the amplitude would not have sufficient reserve in respect of flattenings of the pulse caused by line influence. This could then lead to the receiving circuit not responding. In the mode of feed-in described in the exemplary embodiment, this is avoided since, on the basis of the static analysis principle which is employed, the amplitude and time duration of the useful signal can be selected to be such that, in combination with the opto-electronic switching elements used as indication switching means, the useful signal is sufficiently effective.

I claim:

1. In a telecommunications system of the type in which a plurality of repeaters are permanently assigned to respective zones of origin and operate to seize a register by way of respective switches of a coupling device and a selection switching device which selects a free register, and in which a control path extends from each switch through the selection switching device and through the register, the seized register causing the emission of a switch-through command, the improvement in combination therewith comprising:

test signal producing means connected to the control path and connected to receive and operate in response to the switch-through command to apply a test signal to the control path;

a plurality of opto-electronic switching elements each connected to a respective switch on the repeater side thereof and operated to indicate the zone of origin assigned to the respective repeater in response to a test signal and to produce a corresponding electrical signal;

a plurality of delay circuits each connected to a respective opto-electronic switching element for delaying the respective electrical signal by a respective predetermined time which is matched to the duration of expected interference pulses;

a plurality of trigger circuits each connected to a respective delay circuit and operated by a respective delayed electrical pulse to produce an output signal;

first gating means connected between said plurality of trigger circuits and said test signal producing means for gating through an output signal to terminate the test signal;

said test signal producing means including timing means for causing transmission of the test signal for an interval which exceeds the maximum predetermined delay time;

second gating means connected to said plurality of trigger circuits and operated in response to multiple output signals to produce a further output signal; and recording means connected to said second gating means for recording the further output signal.

2. The improved telecommunications system of claim 1, wherein said test signal producing means comprises:

switching means for receiving and responsive to the switch-through command to provide a turn-on signal and for receiving and responsive to a gated through output signal to terminate the turn-on signal, said timing means connected to said switching means and operated to time in response to the termination of the turn-on signal.

3. The improved telecommunications system of claim 2, wherein said test signal producing means further comprises:

a floating d.c. voltage source connected between said timing means and the control path.

4. The improved telecommunications system of claim 3, wherein said test signal producing means comprises:

an operational amplifier including an output connected to said voltage source and an input connected to said timing means.

* * * * *